US012251010B2

(12) United States Patent
Carnevali et al.

(10) Patent No.: US 12,251,010 B2
(45) Date of Patent: Mar. 18, 2025

(54) CASE WITH ROTATABLE HANDLE AND MAGNETS FOR PORTABLE ELECTRONIC DEVICES

(71) Applicant: National Products, Inc., Seattle, WA (US)

(72) Inventors: Jeffrey D. Carnevali, Seattle, WA (US); Stefan Michael Gottschalk, Seattle, WA (US)

(73) Assignee: National Products, Inc., Seattle, WA (US)

( * ) Notice: Subject to any disclaimer, the term of this patent is extended or adjusted under 35 U.S.C. 154(b) by 303 days.

(21) Appl. No.: 17/978,597

(22) Filed: Nov. 1, 2022

(65) Prior Publication Data

US 2024/0138552 A1  May 2, 2024

(51) Int. Cl.
A45F 5/10 (2006.01)
A45C 11/00 (2006.01)
A45F 5/00 (2006.01)
F16M 13/04 (2006.01)

(52) U.S. Cl.
CPC .............. *A45F 5/10* (2013.01); *A45C 11/00* (2013.01); *A45C 11/002* (2025.01); *A45C 11/003* (2025.01); *A45F 2005/1006* (2013.01); *A45F 5/1516* (2025.01); *A45F 5/1525* (2025.01); *F16M 13/04* (2013.01)

(58) Field of Classification Search
CPC ............... A45F 2200/0525; A45F 5/10; A45F 2005/008; F16M 13/04
USPC .................................. D14/440; 224/218–221
See application file for complete search history.

(56) References Cited

U.S. PATENT DOCUMENTS

| 5,130,899 | A | | 7/1992 | Larkin et al. |
| 6,029,871 | A | * | 2/2000 | Park ................. A45F 5/021 224/666 |
| 6,888,940 | B1 | * | 5/2005 | Deppen .............. B60R 11/0241 379/454 |
| 7,374,142 | B2 | * | 5/2008 | Carnevali .............. F16M 13/00 224/183 |
| 8,070,026 | B2 | | 12/2011 | Wadsworth et al. |
| 8,382,059 | B2 | | 2/2013 | Le Gette et al. |
| 8,550,317 | B2 | * | 10/2013 | Hyseni ..................... A45F 5/00 224/217 |
| 8,605,431 | B2 | | 12/2013 | Cheng et al. |
| 8,662,362 | B1 | | 3/2014 | Bastian et al. |
| 8,690,210 | B1 | * | 4/2014 | May ........................ A45F 5/00 224/217 |
| 8,936,222 | B1 | * | 1/2015 | Bastian ..................... A45F 5/00 224/183 |

(Continued)

FOREIGN PATENT DOCUMENTS

WO 2012/087371 6/2012

*Primary Examiner* — Justin M Larson
(74) *Attorney, Agent, or Firm* — Branch Partners PLLC; Bruce E. Black

(57) ABSTRACT

A case for a portable electronic device includes a case shell having a back panel and at least one side wall extending from the back panel to form a cavity, in combination with the back panel, for receiving the portable electronic device; a handle coupled to a back panel of the case shell; and at least one magnet positioned within the handle and configured for mounting the case and portable electronic device, when present, on an external surface made of a material attracted to the at least one magnet.

20 Claims, 5 Drawing Sheets

(56) References Cited

U.S. PATENT DOCUMENTS

| | | | |
|---|---|---|---|
| 8,939,482 B2 * | 1/2015 | Rasmussen | A45F 5/00 |
| | | | 294/25 |
| 9,016,645 B2 | 4/2015 | Simpson et al. | |
| 9,074,725 B2 | 7/2015 | Trotsky | |
| 9,137,915 B2 | 9/2015 | McCurdy | |
| 9,195,279 B2 | 11/2015 | Carnevali et al. | |
| 9,250,652 B2 * | 2/2016 | London | G06F 1/1628 |
| 9,316,344 B2 * | 4/2016 | Le Gette | A45F 5/02 |
| D756,366 S | 5/2016 | Floersch et al. | |
| 9,331,444 B2 | 5/2016 | Carnevali | |
| 9,397,719 B1 * | 7/2016 | Schmidt | H04B 1/3888 |
| 9,529,387 B2 | 12/2016 | Carnevali | |
| 9,602,639 B2 | 3/2017 | Carnevali | |
| 9,632,535 B2 | 4/2017 | Carnevali et al. | |
| 9,706,026 B2 | 7/2017 | Carnevali | |
| 9,930,943 B2 * | 4/2018 | Lach | H04B 1/3888 |
| 10,050,658 B2 | 8/2018 | Carnevali | |
| 10,054,984 B2 | 8/2018 | Carnevali | |
| 10,093,377 B2 * | 10/2018 | Whitten | G06F 1/1656 |
| 10,112,670 B2 * | 10/2018 | Whitten | F16M 13/02 |
| 10,113,691 B2 * | 10/2018 | Grieve | G06F 1/1626 |
| 10,237,384 B2 * | 3/2019 | Holder | H04M 1/04 |
| D851,092 S * | 6/2019 | Tan | D14/440 |
| D852,802 S * | 7/2019 | Gao | D14/440 |
| 10,389,399 B2 | 8/2019 | Carnevali | |
| 10,454,515 B2 | 10/2019 | Carnevali | |
| 10,595,622 B2 | 3/2020 | Carnevali | |
| 10,630,334 B2 | 4/2020 | Carnevali | |
| 10,652,379 B2 * | 5/2020 | Holder | H04M 1/04 |
| 10,666,309 B2 | 5/2020 | Carnevali | |
| 10,750,844 B2 * | 8/2020 | Peterson | A45F 5/00 |
| 10,778,275 B2 | 9/2020 | Carnevali | |
| 10,812,643 B1 | 10/2020 | Carnevali et al. | |
| 10,897,984 B2 * | 1/2021 | Roth | A45F 5/00 |
| 10,905,227 B2 | 2/2021 | Carnevali | |
| 10,965,336 B2 * | 3/2021 | Hirsch | A45F 5/021 |
| 11,029,731 B1 | 6/2021 | Carnevali | |
| 11,073,865 B1 * | 7/2021 | Lens-Rosal | H02J 7/0044 |
| 11,076,032 B1 | 7/2021 | Carnevali | |
| 11,165,458 B2 | 11/2021 | Carnevali | |
| 11,277,506 B2 | 3/2022 | Carnevali | |
| 11,278,107 B2 * | 3/2022 | Pierson | H04B 1/3888 |
| 11,289,864 B2 | 3/2022 | Carnevali et al. | |
| 11,369,189 B2 * | 6/2022 | Carnevali | A45F 5/10 |
| 11,583,058 B2 * | 2/2023 | Dunbar | G06K 7/10891 |
| 11,784,675 B2 * | 10/2023 | Zhang | H04M 1/04 |
| | | | 455/575.1 |
| 11,832,712 B2 * | 12/2023 | Carnevali | A45F 5/00 |
| D1,015,335 S * | 2/2024 | Cheng | D14/440 |
| D1,023,012 S * | 4/2024 | Lin | D14/440 |
| D1,043,700 S * | 9/2024 | Cheng | D14/440 |
| 2011/0267748 A1 * | 11/2011 | Lane | A45F 5/00 |
| | | | 361/679.01 |
| 2011/0279959 A1 | 11/2011 | Lopez | |
| 2012/0025684 A1 | 2/2012 | Trotsky | |
| 2012/0111881 A1 | 5/2012 | Gaddis, II et al. | |
| 2012/0273541 A1 * | 11/2012 | Zwach | A45C 13/30 |
| | | | 224/220 |
| 2013/0001382 A1 | 1/2013 | Jang | |
| 2013/0254976 A1 | 10/2013 | Aravena | |
| 2013/0299365 A1 | 11/2013 | Andrew | |
| 2013/0300141 A1 | 11/2013 | Byrne | |
| 2014/0077515 A1 | 3/2014 | Rasmussen et al. | |
| 2014/0299488 A1 | 10/2014 | Andrew | |
| 2016/0215926 A1 * | 7/2016 | Pollex | F16M 11/041 |
| 2016/0230925 A1 * | 8/2016 | Le Gette | F16M 13/02 |
| 2016/0345715 A1 * | 12/2016 | Lin | A45C 11/00 |
| 2017/0264725 A1 * | 9/2017 | Holder | B60R 11/0241 |
| 2020/0329133 A1 * | 10/2020 | Surani | A45F 5/00 |
| 2021/0112958 A1 * | 4/2021 | Roth | B60R 11/0241 |
| 2021/0337056 A1 * | 10/2021 | Smith | G06F 1/1626 |
| 2021/0391678 A1 | 12/2021 | Carnevali | |
| 2021/0392773 A1 | 12/2021 | Carnevali | |
| 2024/0138552 A1 * | 5/2024 | Carnevali | A45C 11/00 |

* cited by examiner

CASE WITH ROTATABLE HANDLE AND MAGNETS FOR PORTABLE ELECTRONIC DEVICES

FIELD OF THE INVENTION

The present invention relates generally to a case for a portable electronic device and methods of making and using. The present invention is also directed to a portable electronic device case with a handle, which may be rotatable, and magnets and methods of making and using.

BACKGROUND OF THE INVENTION

Handheld portable electronic device (i.e., mobile devices) are generally well-known. Some electronic devices, such as tablets and cellular telephones, are able to rotate their display between a portrait view and landscape view. These and other portable electronic devices are often mounted in a protective case, some cases have hand, arm, or wrist bands that allow the electronic device to be carried on the user's hand or arm for convenience and easy access. However, conventional hand, arm, or wrist bands are limited in their ability to provide flexibility of either supporting on an external fixed surface or mounting on a user's appendage such as a hand, wrist, or arm.

SUMMARY OF THE INVENTION

The present invention is a case for a portable electronic device, the case having a case shell with a back panel and at least one side wall extending from the back panel to form a cavity, in combination with the back panel, for receiving the portable electronic device; a handle coupled to a back panel of the case shell; and at least one magnet positioned within the handle and configured for mounting the case and portable electronic device, when present, on an external surface made of a material attracted to the at least one magnet.

In at least some embodiments, the case shell is rotatable relative to the handle. In at least some embodiments, the handle includes a plurality of scalloped indents around a perimeter of the handle.

In at least some embodiments, the case further includes a hand strap attached to the case shell or handle and configured for fitting around a hand of a user engaging the handle. In at least some embodiments, the handle defines a strap channel to receive a portion of the strap when it is not fit around a hand of the user. In at least some embodiments, the handle includes a handle base, wherein a portion of the hand strap resides within the handle base.

In at least some embodiments, the handle includes a handle base and a mounting disc attached, or attachable, to the handle base with a portion of the back panel between the handle base and the mounting disc to couple the handle to the back panel. In at least some embodiments, the back panel of the case shell defines an opening and the handle base and mounting disc are configured for fastening to each other through the opening. In at least some embodiments, the back panel includes a handle support disposed around a perimeter of the opening. In at least some embodiments, the handle support defines a plurality of depressions and the handle base includes at least one pin configured to engage the depressions, wherein the case shell is rotatable relative to the handle by applying force to disengage the at least one pin from the depressions and rotate the case shell relative to the handle allowing the at least one pin to reengage the depressions at a rotation stop point. In at least some embodiments, the at least one pin includes a pair of pins disposed opposite each other.

In at least some embodiments, the handle base includes a plurality of abutment structures that extend into the opening and abut the handle support when the handle is attached to the case shell. In at least some embodiments, the mounting disc includes at least one elevated portion that abuts the abutment structures when the handle is attached to the case shell.

In at least some embodiments, the handle base includes at least one magnet holder structure configured to receive and hold the at least one magnet in the handle. In at least some embodiments, the mounting disc includes at least one pin configured for insertion in the at least one magnet holder structure when the handle is attached to the case shell.

Another embodiment is an arrangement that includes any of the cases described above and a portable electronic device configured for insertion into the case.

A further embodiment is a method of using any of the cases described above. The method includes attaching a handle base of the case to a mounting disc of the case and inserting the portable electronic device into the case.

In at least some embodiments, the method further includes attaching the case to a surface using the at least one magnet. In at least some embodiments, the method further includes rotating the case shell and portable electronic device relative to the handle. In at least some embodiments, the handle further includes a hand strap, the method further including inserting a hand of the user into the hand strap.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

The present invention relates generally to a case for a portable electronic device and methods of making and using. The present invention is also directed to a portable electronic device case with a handle, which may be rotatable, and magnets and methods of making and using.

Figure 1A:
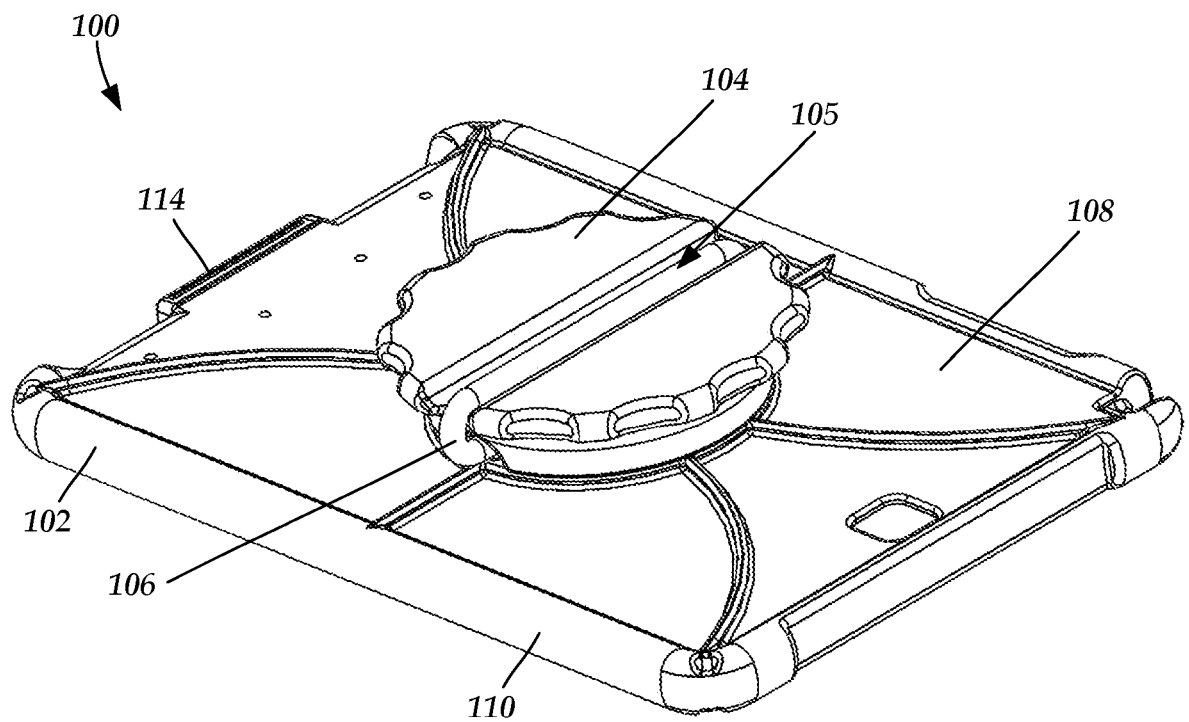
FIG. 1A is a bottom perspective view of one embodiment of a case with a case shell and a handle coupled to the case shell, according to the invention.
Figure 1B:
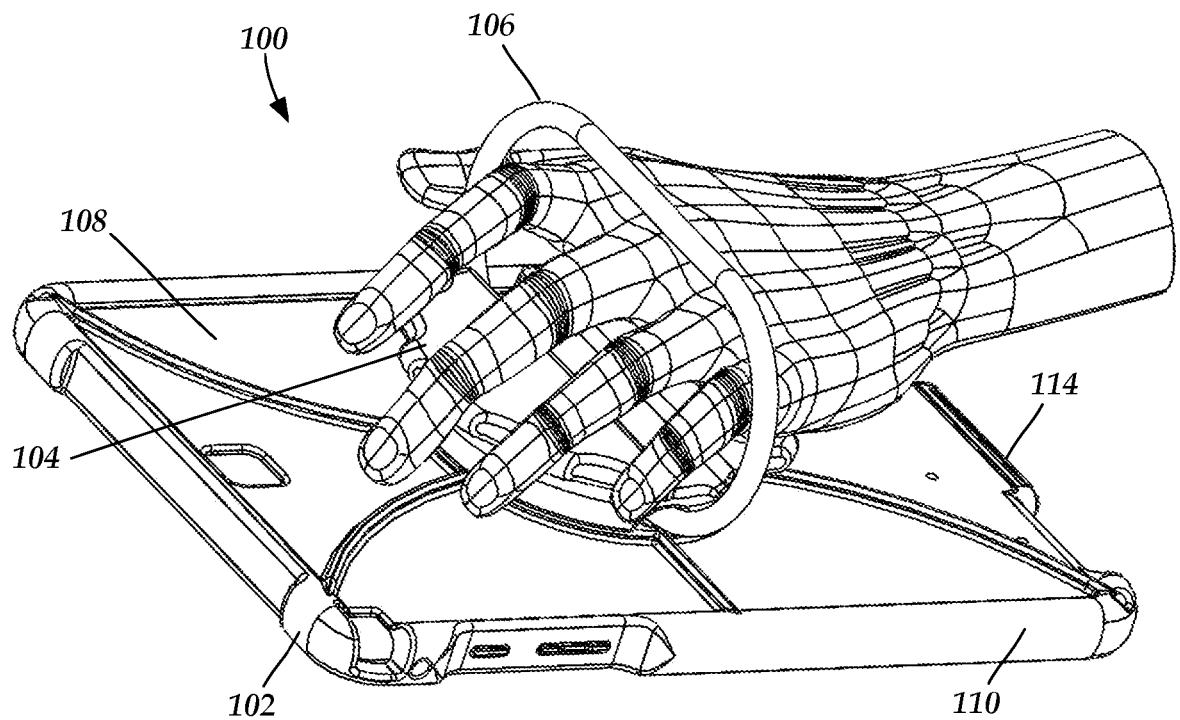
FIG. 1B is a bottom perspective view of the case of FIG. 1A with a user's hand engaging the handle, according to the invention.
Figure 1C:
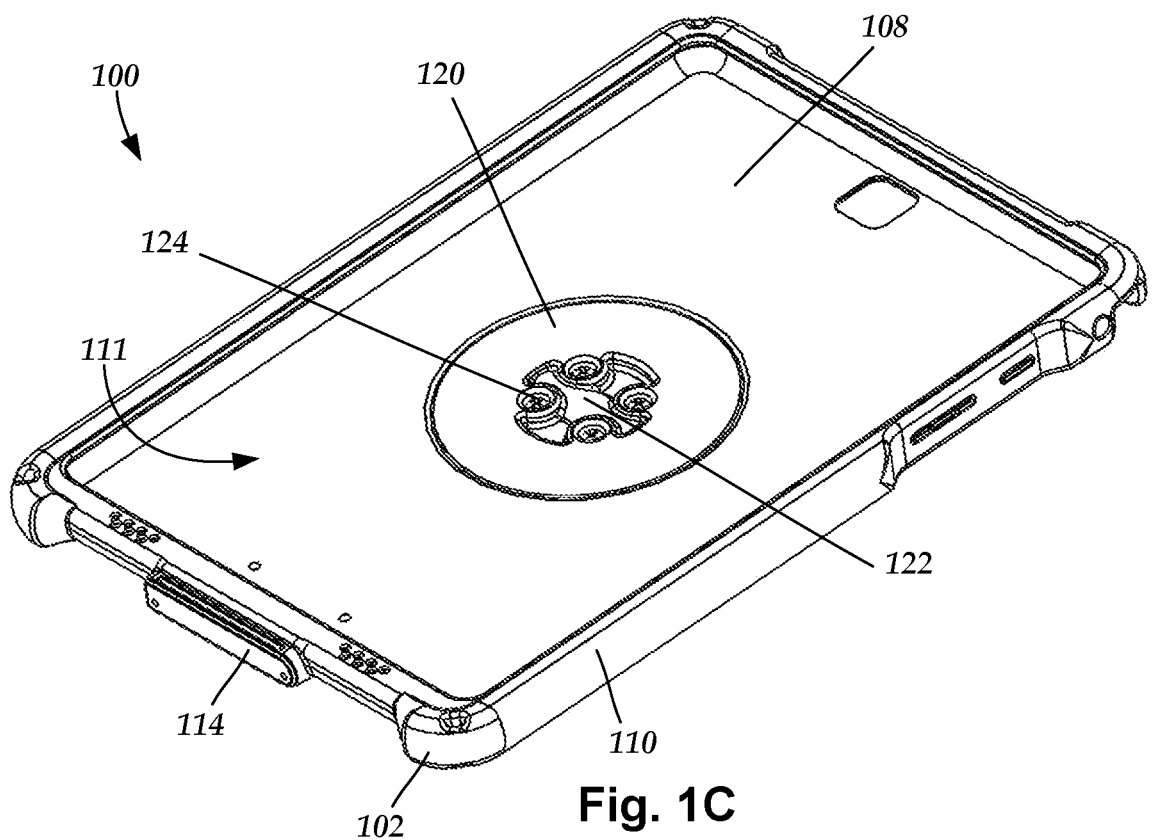
FIG. 1C is a top perspective view of the case of FIG. 1A with the mounting disc of the handle disposed in the cavity of the case shell, according to the invention.
Figure 1D:
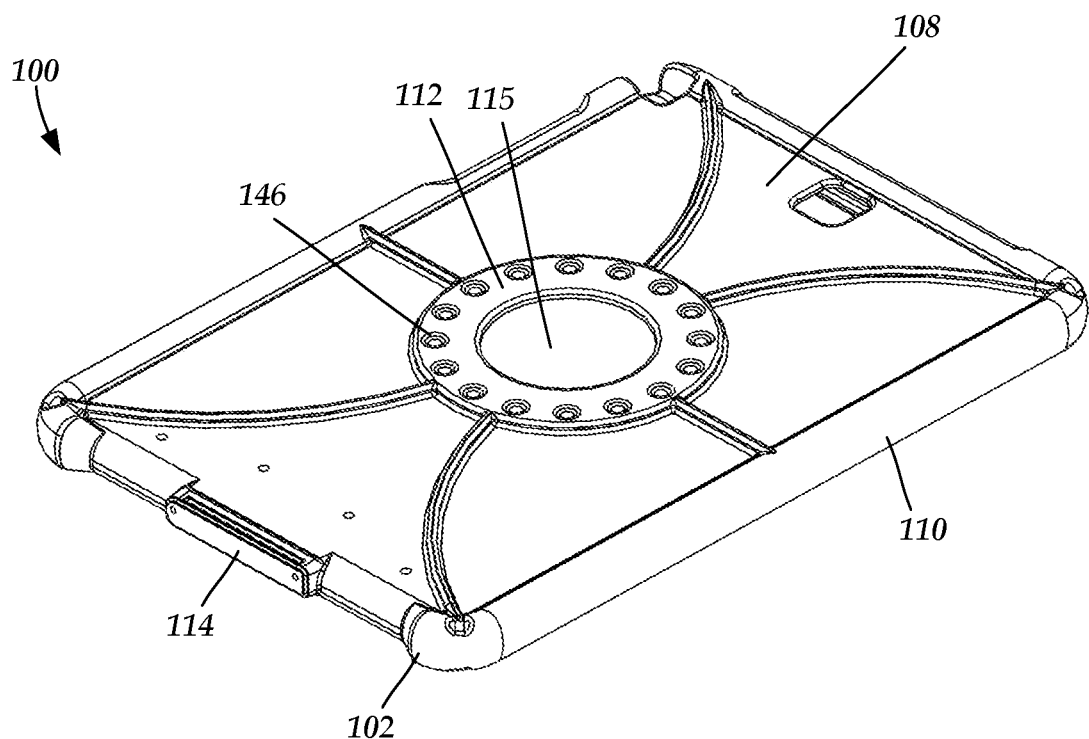
FIG. 1D is a bottom perspective view of the case shell of the case of FIG. 1A without the handle, according to the invention.
Figure 1E:
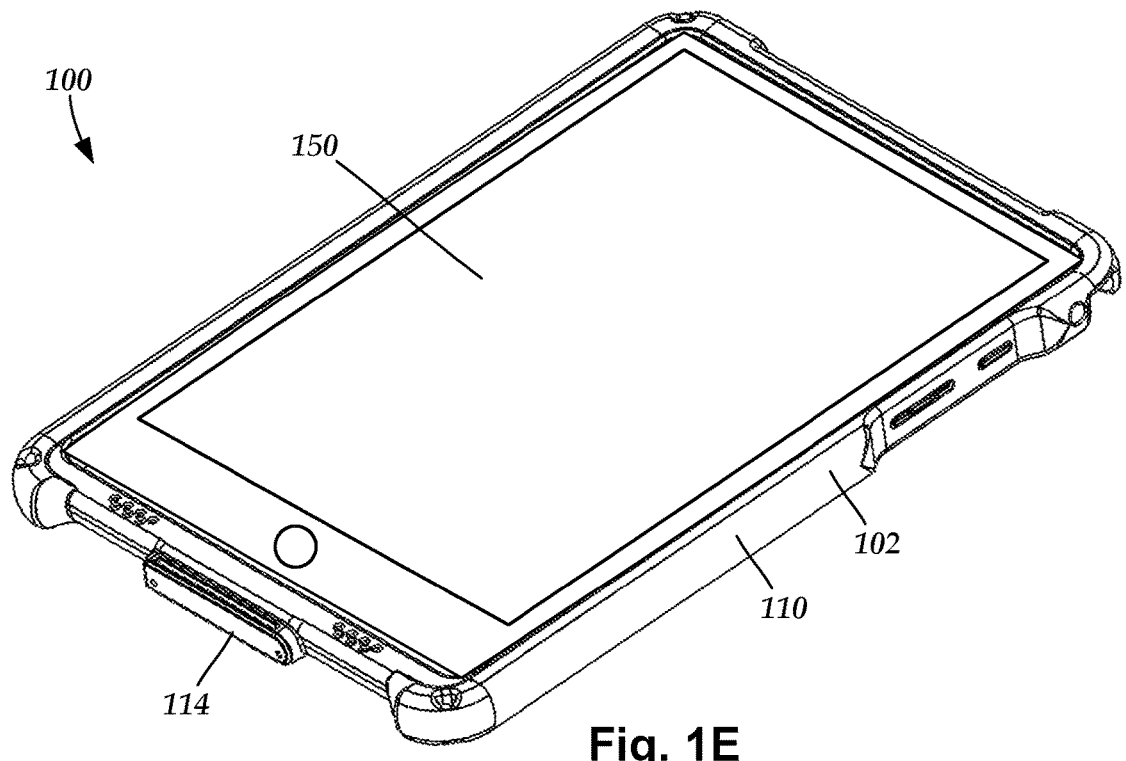
FIG. 1E is a top perspective view of the case of FIG. 1A with a portable electronic device disposed in the case shell, according to the invention.

FIGS. 1A to 1E illustrate a case 100 for a portable electronic device 150 (FIG. 1E). The case 100 includes a case shell 102 and a handle 104 attached to the case shell. In at least some embodiments, the case shell 102 is rotatable relative to the handle 104 (or vice versa). In at least some embodiments, the handle 104 includes a hand strap 106 for fitting over the hand or fingers of a user, as illustrated in FIG. 1B, to facilitate retention of the case and portable electronic device by the user. In at least some embodiments, the handle 104 defines a channel 105 within which the hand strap 106 can lie when the hand strap is not extended around a hand of a user. In at least some embodiments, the hand strap 106 can fit, or be modified to fit, around a wrist or arm. The case 100 can be designed for a variety of different portable electronic devices including, but not limited to, mobile phones, cellular phones, tablets, laptop computers, personal digital assistants, or the like or any other suitable portable electronic device.

The case 100 includes a back panel 108 and at least one sidewall 110 that, in combination, define a cavity 111 (FIG. 1C) for receiving the portable electronic device 150, as illustrated in FIG. 1E. The case 100 also includes an opening 115 in the back panel 108 and a handle support 112 surrounding the opening, as illustrated in FIG. 1D.

Examples of cases 100 for a portable electronic device 150 that can include, or be modified to include, the handle 104 presented herein are described in U.S. Pat. Nos. 9,195,279; 9,331,444; 9,529,387; 9,602,639; 9,632,535; 9,706,026; 10,389,399; 10,050,658; 10,054,984; 10,454,515; 10,630,334; 10,666,309; 10,778,275 10,812,643; 11,029,731; 11,076,032; 11,165,458; 11,277,506; and 11,289,864 and U.S. Patent Applications Publication Nos. 2021/0391678 and 2021/0392773, all of which are incorporated herein by reference in their entireties. In at least some embodiments, the case 100 includes an adapter 114 for coupling the case 100 and portable electronic device 150 to a docking cradle or other docking arrangement. However, it will be understood that covers without an adapter can also be used.

Figure 2:
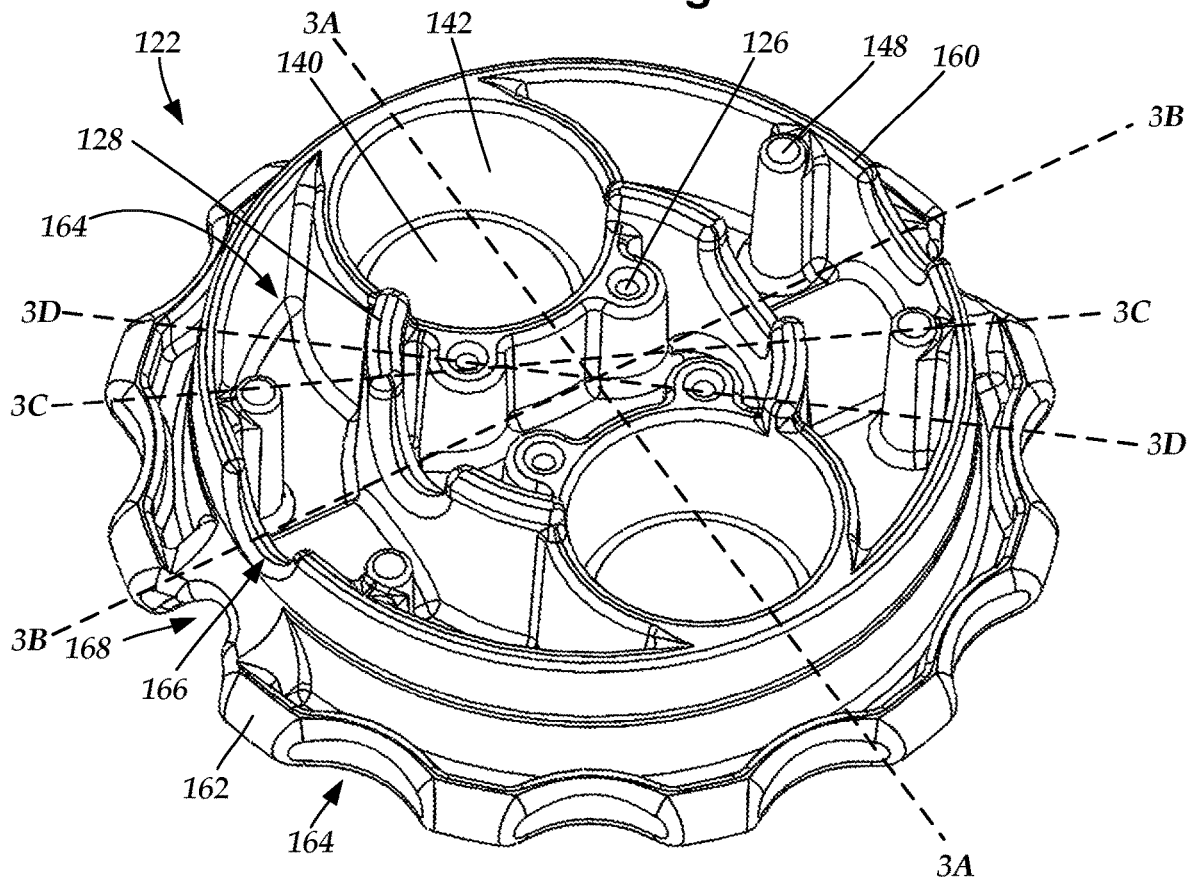
FIG. 2 is a top perspective view of a handle base of the handle of the case of FIG. 1A, according to the invention, FIG. 2 includes lines illustrating cross-sectional cuts of FIGS. 3A to 3D through the handle base.

The handle 104 includes a mounting disc 120, as illustrated in FIG. 1C, and a handle base 122, as illustrated in FIG. 2. The handle base 122 includes an outer wall 160, a gripping flange 162 disposed over the outer wall 160, and an interior cavity 164 defined by the outer wall and gripping flange. In at least some embodiments, the gripping flange 162 includes one or more scalloped indents 164 to facilitate gripping and operation of the handle by a user. In at least some embodiments, the outer wall 160 defines opposing openings 166 and the gripping flange 162 defines opposing indents 168 and the channel 105 for the hand strap 106.

In at least some embodiments, the hand strap 106 forms a loop (see, FIG. 3B) that extends through the interior cavity 164 of the handle base 122. In at least some embodiments, the hand strap 106 is formed of a stretchable polymeric or other material or includes a spring (preferably encased in a polymer sheath), such as an extension spring, which permits reversible stretching to receive the hand of the user, as illustrated in FIG. 1B. Any other suitable hand strap 106 can be used including, but not limited to, hand straps that do not appreciably stretch and can be made of materials such as plastics, fabric, leather, or the like or any combination thereof.

In at least some embodiments, the handle base 122 includes at least one magnet 140 disposed in a cavity 144 defined by a magnet holder structure 142. In the illustrated embodiments, the handle base 122 includes two magnets 140 and two magnet holder structures 142 in the form of cylinders, as illustrated in FIG. 2. In at least some embodiments, the magnet holder structures 142 may also facilitate alignment or attachment of the handle 104 to the case shell 102, as described in more detail below.

Any suitable magnet 140 can be used. In at least some embodiments, the magnet(s) 140 in the handle base 122 of the handle 104 are arranged to mount the case 100 and portable electronic device 150 on an external surface made of a material attracted to the magnet(s). For example, in at least some embodiments, the magnet(s) 140 facilitate attachment of the case 100 and portable electronic device 150 to the door of a refrigerator or other appliance with a metal door. The magnet(s) 140 are selected to maintain the position of the case 100 and portable electronic device 150 in position when placed on the external surface, particularly when placed on a vertical surface.

Figure 3A:
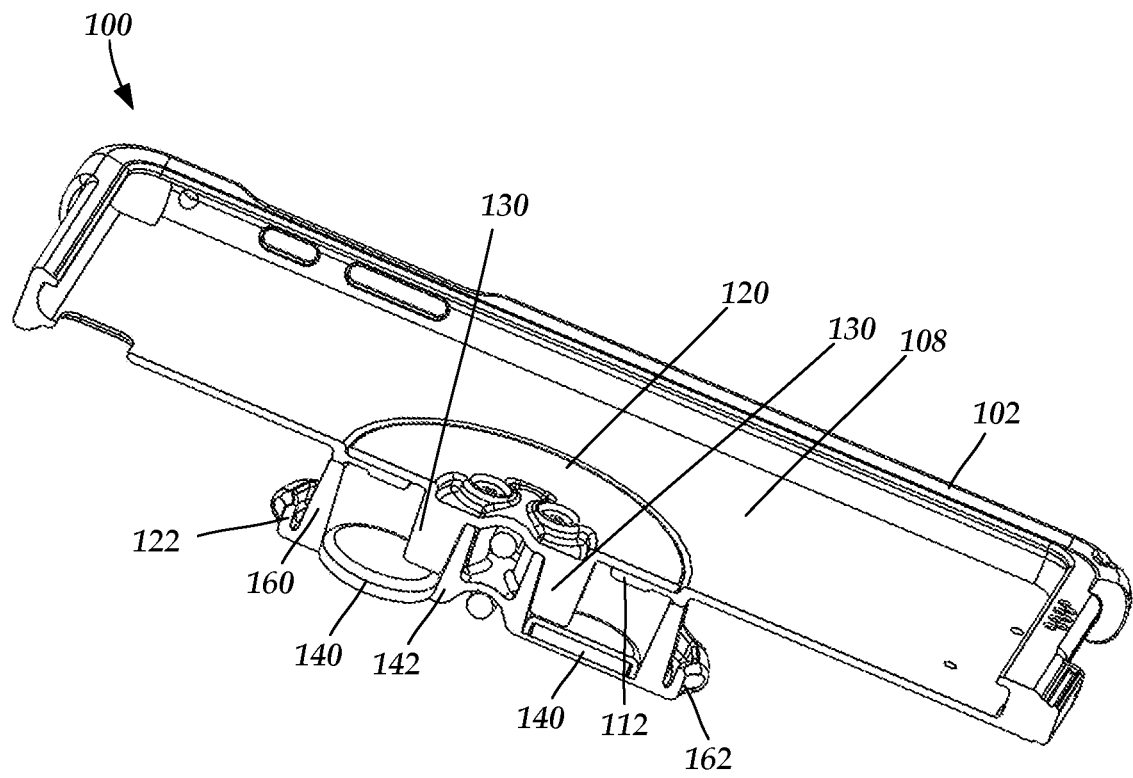
FIG. 3A is a top perspective cross-sectional view of the case of FIG. 1A illustrating magnets within the handle base, according to the invention.
Figure 3B:
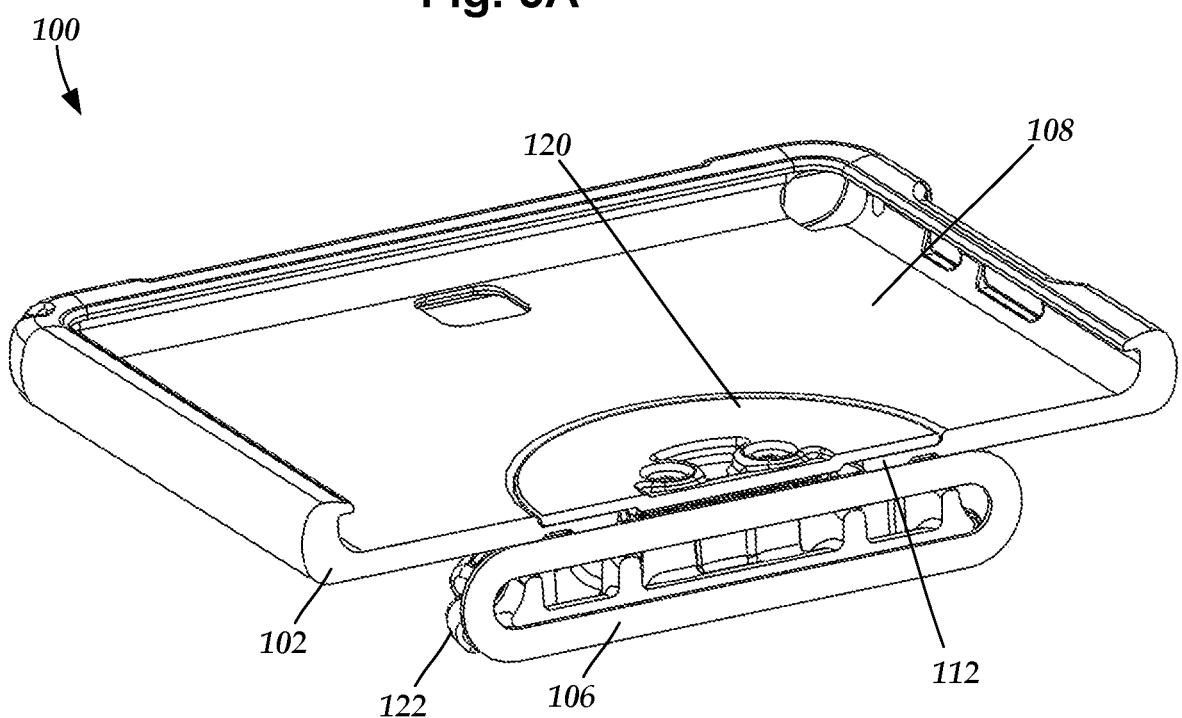
FIG. 3B is another top perspective cross-sectional view of the case of FIG. 1A illustrating a hand strap and the handle base, according to the invention.
Figure 3C:
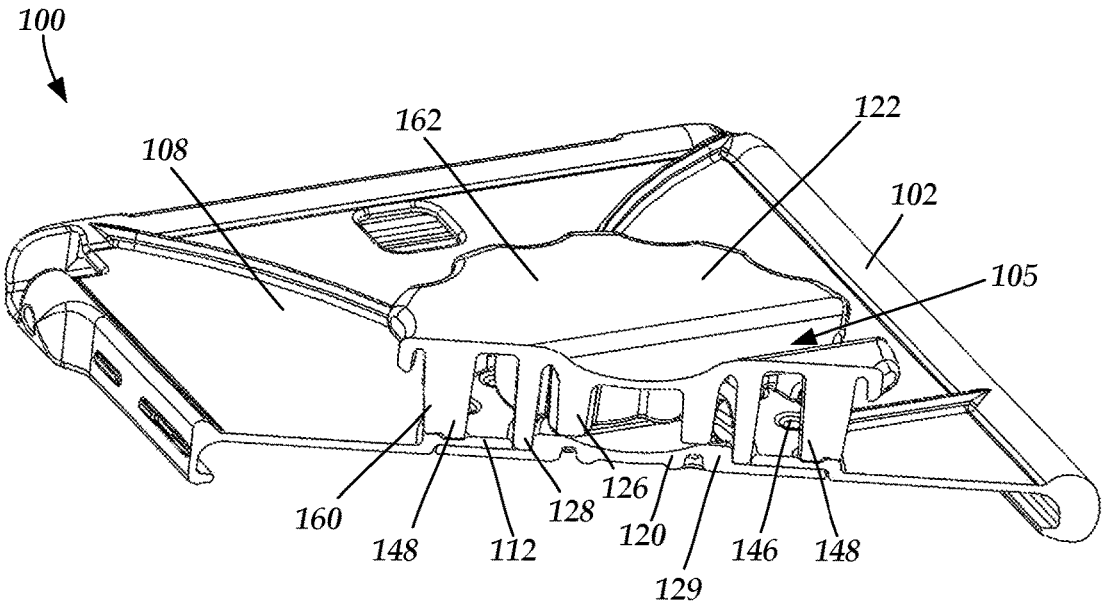
FIG. 3C is a bottom perspective cross-sectional view of the case of FIG. 1A illustrating elements of the handle and case that facilitate alignment, according to the invention.
Figure 3D:
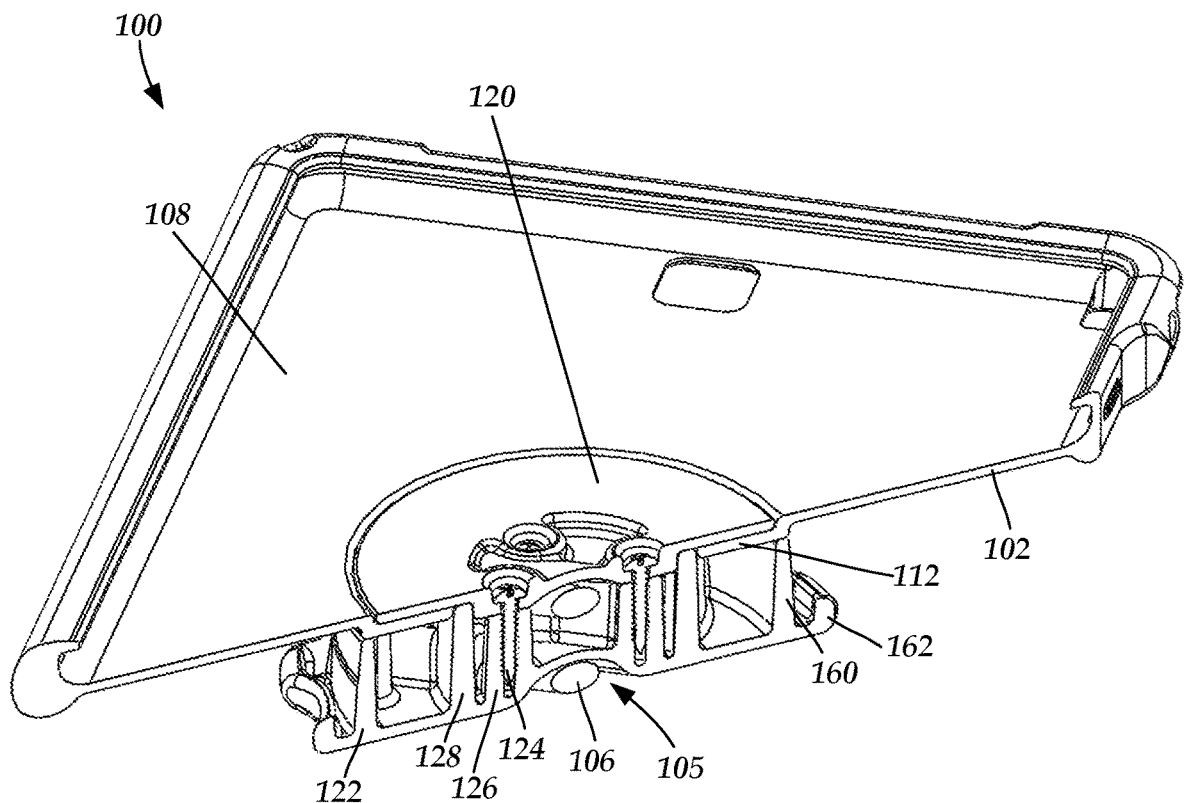
FIG. 3D is a further top perspective cross-sectional view of the case of FIG. 1A illustrating attachment of the handle base and mounting disc to the case shell, according to the invention.

FIGS. 3A to 3D are cross-sectional views of the case 100, mounting disc 120, and handle base 122. FIG. 2 includes dotted lines indicating the cross-sectional cuts of FIGS. 3A and 3D relative to the handle base 122. The mounting disc 120 fits into the cavity 111 of the case 100 and is attached, through the opening 115 in the back panel 108 of the case 100, to the handle base 122 using fasteners 124, as illustrated in FIGS. 1C and 3D, which engage fastener retainers 126 (FIGS. 2 and 3D) in the handle base 122. For example, the fasteners 124 can be screws and the fastener retainers 126 can include an interior threading to receive the screw as the screw is driven into the fastener retainer using a tool such as a screwdriver. In at least some embodiments, the fastener retainers 126 are coupled to the magnet holder structure(s) 142 to form a unified body, as illustrated in FIG. 2.

In at least some embodiments, the mounting disc 120 includes one or more mounting pins 130 that extend through the opening 115 and into the cavity 144 of the magnet holder structure(s) 142, as illustrated in FIG. 3A. In at least some embodiments, the mounting pin(s) 130 may engage or push against the magnet(s) 140 and may facilitate retention of the magnets in the handle base 102. Other methods for magnet retention that can be used additionally or alternatively include, but are not limited to, friction fit, adhesive, insert molding, or the like or any combination thereof. In at least some embodiments, the mounting pins 130 engage the magnet holder structure(s) 142. In at least some embodiments, this engagement can facilitate alignment of the handle base 122 with the mounting disc 120.

The handle support 112 is disposed, at least in part, between the mounting disc 120 and the handle base 122, as illustrated in FIGS. 3A to 3D. In at least some embodiments, the handle base 122 includes two or more abutment structures 128 (where, optionally, pairs of the abutment structures are disposed opposite each other) that, when the handle 104 is disposed on the case 100, extend into the opening 115 and abut the handle support 112, as illustrated in FIG. 3D. This arrangement can facilitate alignment of the handle base 122 with the case 100. In addition, in at least some embodiments, an elevated portion 129 of the mountings disc 120 can abut the abutment structures, as illustrated in FIG. 3C, to further facilitate the alignment of the handle base 122 and mounting disc 120 with the case 100.

In at least some embodiments, the case shell 102 can rotate relative to the handle 104. In at least some embodiments, the case shell 102 and handle support 112 can rotate with the handle base 122 and mounting disc 120 remaining stationary. Alternatively, the handle base 122 and mounting disc 120 can rotate with the handle support 112 remaining stationary.

In at least some embodiments, the handle support 112 includes depressions 146 (FIG. 1D) and the handle base 122 includes one or more pins 148 that extend beyond the outer wall 160 so that the pins can engage the depressions in the handle support and resist rotation of the case shell 102 relative to the handle base 122. In at least some embodiments, the pins 148 and depressions 146 are arranged so that application of force by a user will disengage the pins 148 from the depressions 146 in which the pins reside and permit rotation of the case shell 102 relative to the handle base 122 with reengagement of the pins and depressions when the force is removed. In at least some embodiments, the length of the pins 148 and the number of pins can influence the amount of force needed to rotate the case shell 102 relative to the handle base 122. In FIG. 2, the illustrated handle base 122 include four pins 148. In at least some embodiments, the pins 148 and depressions 146 are arranged so that the weight and torque of the portable electronic device 150 and case 100 alone will not rotate the case shell 102 relative to the handle base 122.

Other methods can be used to limit rotation absent force applied by the user. In at least some embodiments, one or both of the handle base 122 or the mounting disc 120, in combination with the handle support, provide surface resistance (e.g., friction) to rotation to so that the rotation ideally only occurs when intended by the user. Application of force by the user can overcome the surface resistance to allow rotation.

The above specification provides a description of the structure, manufacture, and use of the invention. Since many embodiments of the invention can be made without departing from the spirit and scope of the invention, the invention also resides in the claims hereinafter appended.

What is claimed as new and desired to be protected is:

1. A case for a portable electronic device, the case comprising:
   a case shell comprising a back panel and at least one side wall extending from the back panel to form a cavity, in combination with the back panel, for receiving the portable electronic device;
   a handle coupled to a back panel of the case shell, wherein the handle comprises a handle base and a mounting disc attached, or attachable, to the handle base with a portion of the back panel between the handle base and the mounting disc to couple the handle to the back panel; and
   at least one magnet positioned within the handle and configured for mounting the case and portable electronic device, when present, on an external surface made of a material attracted to the at least one magnet, wherein the handle base comprises at least one magnet holder structure configured to receive and hold the at least one magnet in the handle.

2. The case of claim 1, wherein the case shell is rotatable relative to the handle.

3. The case of claim 1, further comprising a hand strap attached to the case shell or handle and configured for fitting around a hand of a user engaging the handle.

4. The case of claim 3, wherein the handle defines a strap channel to receive a portion of the strap when it is not fit around a hand of the user.

5. The case of claim 1, wherein the back panel of the case shell defines an opening and the handle base and mounting disc are configured for fastening to each other through the opening.

6. The case of claim 5, wherein the back panel comprises a handle support disposed around a perimeter of the opening.

7. The case of claim 6, wherein the handle base comprises a plurality of abutment structures that extend into the opening and abut the handle support when the handle is attached to the case shell.

8. The case of claim 7, wherein the mounting disc comprises at least one elevated portion that abuts the abutment structures when the handle is attached to the case shell.

9. The case of claim 1, wherein the mounting disc comprises at least one pin configured for insertion in the at least one magnet holder structure when the handle is attached to the case shell.

10. The case of claim 1, wherein the handle comprises a plurality of scalloped indents around a perimeter of the handle.

11. An arrangement, comprising:
    the case of claim 1; and
    a portable electronic device configured for insertion into the case.

12. A method of using the case of claim 1, the method comprising:
    attaching the handle base to the mounting disc; and
    inserting the portable electronic device into the case.

13. The method of claim 12, further comprising attaching the case to a surface using the at least one magnet.

14. The method of claim 12, further comprising rotating the case shell and portable electronic device relative to the handle.

15. The method of claim 12, wherein the handle further comprises a hand strap, the method further comprising inserting a hand of the user into the hand strap.

16. A case for a portable electronic device, the case comprising:
    a case shell comprising a back panel and at least one side wall extending from the back panel to form a cavity, in combination with the back panel, for receiving the portable electronic device;
    a handle coupled to a back panel of the case shell;
    at least one magnet positioned within the handle and configured for mounting the case and portable electronic device, when present, on an external surface made of a material attracted to the at least one magnet; and
    a hand strap attached to the case shell or handle and configured for fitting around a hand of a user engaging the handle, wherein the handle comprises a handle base, wherein a portion of the hand strap resides within the handle base.

17. The case of claim 16, wherein the handle comprises a handle base and a mounting disc attached, or attachable, to the handle base with a portion of the back panel between the handle base and the mounting disc to couple the handle to the back panel.

18. The case of claim 17, wherein the handle base comprises at least one magnet holder structure configured to receive and hold the at least one magnet in the handle.

19. A case for a portable electronic device, the case comprising:
- a case shell comprising a back panel and at least one side wall extending from the back panel to form a cavity, in combination with the back panel, for receiving the portable electronic device;
- a handle coupled to a back panel of the case shell, wherein the handle comprises a handle base and a mounting disc attached, or attachable, to the handle base with a portion of the back panel between the handle base and the mounting disc to couple the handle to the back panel, wherein the back panel of the case shell defines an opening and the handle base and mounting disc are configured for fastening to each other through the opening, wherein the back panel comprises a handle support disposed around a perimeter of the opening, wherein the handle support defines a plurality of depressions and the handle base comprises at least one pin configured to engage the depressions, wherein the case shell is rotatable relative to the handle by applying force to disengage the at least one pin from the depressions and rotate the case shell relative to the handle allowing the at least one pin to reengage the depressions at a rotation stop point; and
- at least one magnet positioned within the handle and configured for mounting the case and portable electronic device, when present, on an external surface made of a material attracted to the at least one magnet.

20. The case of claim 19, wherein the at least one pin comprises a pair of pins disposed opposite each other.

* * * * *